US010279259B2

(12) United States Patent
Jiang et al.

(10) Patent No.: US 10,279,259 B2
(45) Date of Patent: May 7, 2019

(54) METHOD AND DEVICE FOR GENERATING AND UPLOADING GAME DATA

(71) Applicant: Jingcai Online Technology (Dalian) Co., Ltd., Dalian, Liaoning Province (CN)

(72) Inventors: Changsong Jiang, Dalian (CN); Jianbin Fang, Dalian (CN); Jiqing Zhang, Dalian (CN); Jingzhao Yang, Dalian (CN)

(73) Assignee: Jingcai Online Technology (Dalian) Co., Ltd., Dalian (CN)

( * ) Notice: Subject to any disclaimer, the term of this patent is extended or adjusted under 35 U.S.C. 154(b) by 162 days.

(21) Appl. No.: 15/220,592

(22) Filed: Jul. 27, 2016

(65) Prior Publication Data

US 2017/0056769 A1 Mar. 2, 2017

(30) Foreign Application Priority Data

Aug. 24, 2015 (CN) .......................... 2015 1 0524151

(51) Int. Cl.
| | | |
|---|---|---|
| *A63F 13/358* | (2014.01) | |
| *A63F 13/52* | (2014.01) | |
| *A63F 13/60* | (2014.01) | |
| *A63F 13/355* | (2014.01) | |
| *A63F 13/25* | (2014.01) | |
| *A63F 13/63* | (2014.01) | |

(52) U.S. Cl.
CPC ............ *A63F 13/52* (2014.09); *A63F 13/355* (2014.09); *A63F 13/358* (2014.09); *A63F 13/60* (2014.09); *A63F 13/25* (2014.09); *A63F 13/63* (2014.09)

(58) Field of Classification Search
CPC .......... A63F 13/00; A63F 13/12; A63F 13/25; A63F 13/358; A63F 13/60; A63F 13/63; A63F 13/52
USPC ................................................ 463/30–32, 42
See application file for complete search history.

(56) References Cited

U.S. PATENT DOCUMENTS

| 8,356,059 B2 * | 1/2013 | Wiljanen .......... G06F 17/30038 |
| | | 705/51 |
| 2008/0016176 A1 * | 1/2008 | Leitner .................. A63F 13/10 |
| | | 709/217 |

(Continued)

FOREIGN PATENT DOCUMENTS

CN 103377039 10/2013

*Primary Examiner* — William H McCulloch, Jr.
*Assistant Examiner* — Chase E Leichliter
(74) *Attorney, Agent, or Firm* — Norton Rose Fulbright US LLP

(57) ABSTRACT

A method and device for generating and uploading game data are disclosed, which relate to the technical field of Internet. The method for generating game data comprises: obtaining a scene template of a target game scene from a preset scene template database; obtaining a scene object of the target game scene from a preset scene object database; determining the location of the scene object; obtaining display effect of the scene object from a preset scene object display effect database, and displaying the scene object in the scene template of the target game scene; determining illumination effect of the scene object according to the determined location of the scene object and illumination parameters of a game engine, and rendering the scene object in the target game scene and generating the target game scene.

20 Claims, 4 Drawing Sheets

(56) References Cited

U.S. PATENT DOCUMENTS

| | | | | |
|---|---|---|---|---|
| 2009/0253517 | A1* | 10/2009 | Bererton | A63F 13/12 463/42 |
| 2011/0256931 | A1* | 10/2011 | Yazici | A63F 13/65 463/42 |
| 2015/0165310 | A1* | 6/2015 | Rebh | A63F 13/10 463/29 |
| 2015/0314198 | A1* | 11/2015 | Mishkin | G09B 7/00 463/42 |
| 2016/0012640 | A1* | 1/2016 | Abraham | G06T 19/006 345/420 |

* cited by examiner

METHOD AND DEVICE FOR GENERATING AND UPLOADING GAME DATA

CROSS-REFERENCE TO RELATED APPLICATIONS

This application claims priority to Chinese Application No. 201510524151.1, filed Aug. 24, 2015, and entitled "METHOD AND DEVICE FOR GENERATING AND UPLOADING GAME DATA", which is incorporated herein by reference.

TECHNICAL FIELD

The present invention relates to the technical field of Internet, and in particular, to a method and a device for generating and uploading game data.

BACKGROUND

With the improved performances of terminals used by users, games have increasingly entered the lives of people. Among these games, some are games with a network function and some are games without a network function. Wherein, when a user is playing a game with a network function, he/she often shares his/her game scene information to other users, for example, a user shares a map made by himself/herself to other users in a battle game, and a user shares a room arranged by himself/herself to other users in a pretending game etc.

In the prior art, when generating a game scene, it is often required to determine background information of the scene, scene objects in the scene, location of each scene object, illumination effects and display effects and the like, wherein, illumination effect and display effect and the like of each scene object are all generated by adjusting the scene objects according to the background information of the scene by users. Thus, it is necessary to send all the information, such as the illumination effect and display effect of each scene object, to other users when sharing game scenes to other users. By applying the above method, users can smoothly share their game scenes to other users. However, the amount of data such as the illumination effects and display effects of scene objects are relatively large, thus the amount of data of game scenes to be shared are also relatively large, which makes it slow to upload scene data in one client and to download game scene data in another client, thereby adversely influencing users' experience.

SUMMARY

Embodiments of the present invention disclose a method and a device for generating and uploading game data so as to decrease the amount of data of game scenes.

To achieve the above objectives, embodiments of the present invention disclose a method for generating game data, which comprises:

obtaining a scene template of a target game scene from a preset scene template database according to an identifier of a user-selected scene template;

obtaining a scene object of the target game scene from a preset scene object database according to an identifier of a user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus generating the target game scene.

In a specific implementation of the present invention, the method for generating game data further comprises:

generating scene data of the target game scene according to the target game scene, wherein, the scene data of the target game scene at least comprises: an identifier of a scene template of the target game scene, an identifier of a scene object in the target game scene and location information of the scene object in the target game scene; and storing the scene data.

In a specific implementation of the present invention, the method for generating game data further comprises:

detecting whether current remaining storage space is larger than a preset threshold; and if yes, storing all data of the target game scene.

In a specific implementation of the present invention, the method for generating game data further comprises:

performing an edition operation for the target game scene; and updating the scene data according to the edition operation.

In a specific implementation of the present invention, the step of obtaining a scene object of the target game scene from a preset scene object database according to an identifier of a user-selected scene object comprises:

determining identifiers of user-selectable scene objects according to user attribute information of a user; and obtaining the scene object in the target game scene from the preset scene object database according to an identifier of a scene object selected by the user from the identifiers of the user-selectable scene objects.

To achieve the above objectives, embodiments of the present invention disclose a method for generating game data, which comprises:

obtaining a target game scene; and extracting, from the target game scene, an identifier of a scene template of the target game scene, an identifier of a scene object in the target game scene and location information of the scene object in the target game scene, and generating, according to the extracted information, scene data for reconstructing the target game scene.

To achieve the above objectives, embodiments of the present invention disclose a method for uploading game data, which comprises:

obtaining a target game scene;

obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, and wherein, the location information of the scene object in the target game scene is used in combination with illumination parameters of a game engine itself to determine illumination effect of the scene object in the target game scene, the identifier of the scene object in the target game scene is used in combination with the location information of the scene object in the target game scene and a preset scene object display effect database to determine display effect of the scene object in the target game scene; and sending to a first destination end the data to be uploaded so as to complete uploading data for the target game scene.

In a specific implementation of the present invention, the step of obtaining data to be uploaded of the target game scene in the case that a preset condition for uploading data is satisfied comprises:

verifying whether the target game scene satisfies a preset verification condition corresponding to a current game mode; and if yes, obtaining the data to be uploaded of the target game scene.

In a specific implementation of the present invention, the method for uploading game data further comprises:

sending to a second destination end a data downloading instruction for a game scene to be downloaded; and receiving an identifier of a scene template of the game scene to be downloaded, an identifier of a scene object in the game scene to be downloaded and location information of the scene object in the game scene to be downloaded that are fed back by the second destination end.

In a specific implementation of the present invention, after receiving an identifier of a scene template of the game scene to be downloaded, an identifier of a scene object in the game scene to be downloaded and location information of the scene object in the game scene to be downloaded that are fed back by the second destination end, the method further comprises:

obtaining the scene template of the game scene to be downloaded from a preset scene template database according to the identifier of the scene template of the game scene to be downloaded;

obtaining the scene object in the game scene to be downloaded from a preset scene object database according to the identifier of the scene object in the game scene to be downloaded;

determining illumination effect of the scene object in the game scene to be downloaded according to the location information of the scene object in the game scene to be downloaded and illumination parameters of the game engine itself;

determining display effect of the scene object in the game scene to be downloaded according to the scene object in the game scene to be downloaded, the location information of the scene object in the game scene to be downloaded and the preset scene object display effect database; and displaying, in the scene template of the game scene to be downloaded, the scene object in the game scene to be downloaded in a manner of the determined display effect of the scene object, and rendering the scene object in the game scene to be downloaded in a manner of the determined illumination effect of the scene object according to the location of the scene object in the game scene to be downloaded.

In a specific implementation of the present invention, the step of obtaining a target game scene further comprises:

obtaining a scene template of the target game scene from a preset scene template database according to an identifier of a user-selected scene template;

obtaining a scene object of the target game scene from a preset scene object database according to an identifier of a user-selected scene object;

determining the location of the scene object in the target game scene according to an edition instruction or a saving instruction for the scene object in the target game scene;

obtaining display effect of the scene object in the target game scene from the preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining the illumination effect of the scene object in the target game scene according to the determined location of the scene object and the illumination parameters of the game engine itself, and rendering the scene object in the target game scene in a manner of the determined illumination effect and thus obtaining the target game scene.

To achieve the above objectives, embodiments of the present invention disclose a device for generating game data, which comprises:

a first scene template obtaining module for obtaining a scene template of a target game scene from a preset scene template database according to an identifier of a user-selected scene template;

a first scene object obtaining module for obtaining a scene object of the target game scene from a preset scene object database according to an identifier of a user-selected scene object;

a location determining module for determining the location of the scene object in the target game scene according to an edition instruction or a saving instruction for the scene object in the target game scene;

a scene object display module for obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and a first scene object rendering module for determining illumination effect of the scene object in the target game scene according to the determined location of the scene object and illumination parameters of a game engine itself, and rendering the scene object in the target game scene in a manner of the determined illumination effect and thus generating the target game scene.

In a specific implementation of the present invention, the device for generating game data further comprises:

a scene data generating module, for generating scene data of the target game scene according to the target game scene, wherein, the scene data of the target game scene at least comprises: an identifier of a scene template of the target game scene, an identifier of a scene object in the target game scene and location information of the scene object in the target game scene; and a first data storage module for storing the scene data.

In a specific implementation of the present invention, the device for generating game data further comprises:

a storage space detecting module for detecting whether current remaining storage space is larger than a preset threshold; and a second data storage module for storing all data of the target game scene in the case that the detection result from the storage space detecting module is true.

In a specific implementation of the present invention, the device for generating game data further comprises:

an edition operation performing module for performing an edition operation for the target game scene; and a scene data updating module for updating the scene data according to the edition operation.

In a specific implementation of the present invention, the first scene object obtaining module further comprises:

a scene object identifier determining sub-module for determining identifiers of user-selectable scene objects according to user attribute information of a user; and a scene object obtaining sub-module for obtaining the scene object in the target game scene from the preset scene object database according to an identifier of the scene object selected by the user from the identifiers of the user-selectable scene objects.

To achieve the above objectives, embodiments of the present invention disclose a device for generating game data, which comprises:

a first game scene obtaining module for obtaining a target game scene; and a scene data generating module for extracting, from the target game scene, an identifier of a scene template of the target game scene, an identifier of a scene object in the target game scene and location information of the scene object in the target game scene, and generating, according to the extracted information, scene data for reconstructing the target game scene.

To achieve the above objectives, embodiments of the present invention disclose a device for uploading game data, which comprises:

a second game scene obtaining module for obtaining a target game scene; and an uploaded data obtaining module for obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, and wherein, the location information of the scene object in the target game scene is used in combination with illumination parameters of a game engine itself to determine illumination effect of the scene object in the target game scene, the identifier of the scene object in the target game scene is used in combination with the location information of the scene object in the target game scene and a preset scene object display effect database to determine display effect of the scene object in the target game scene; and an uploaded data sending module for sending to a first destination end the data to be uploaded, so as to complete uploading data for the target game scene.

In a specific implementation of the present invention, the uploaded data obtaining module comprises:

a game scene verifying sub-module for verifying whether the target game scene satisfies a preset verification condition corresponding to a current game mode;

an uploaded data obtaining sub-module, for obtaining the data to be uploaded of the target game scene in the case that the verification result from the game scene verifying sub-module is true.

In a specific implementation of the present invention, the device for uploading game data further comprises:

a downloading instruction sending module for sending to a second destination end a data downloading instruction for a game scene to be downloaded; and a feedback information receiving module for receiving an identifier of a scene template of the game scene to be downloaded, an identifier of a scene object in the game scene to be downloaded and location information of the scene object in the game scene to be downloaded that are fed back by the second destination end.

In a specific implementation of the present invention, the device for uploading game data further comprises:

a second scene template obtaining module for obtaining, after receiving the information received by the feedback information receiving module, the scene template of the game scene to be downloaded from a preset scene template database according to the identifier of the scene template of the game scene to be downloaded;

a second scene object obtaining module for obtaining the scene object in the game scene to be downloaded from a preset scene object database according to the identifier of the scene object in the game scene to be downloaded;

an illumination effect determining module for determining illumination effect of the scene object in the game scene to be downloaded according to the location information of the scene object in the game scene to be downloaded and illumination parameters of the game engine itself;

a display effect determining module for determining display effect of the scene object in the game scene to be downloaded according to the scene object in the game scene to be downloaded, the location information of the scene object in the game scene to be downloaded and the preset scene object display effect database; and a second scene object rendering module for displaying, in the scene template of the game scene to be downloaded, the scene object in the game scene to be downloaded in a manner of the determined display effect of the scene object and rendering the scene object in the game scene to be downloaded in a manner of the determined display effect of the scene object, according to the location of the scene object in the game scene to be downloaded.

In a specific implementation of the present invention, the first game scene obtaining module comprises:

a scene template obtaining sub-module for obtaining a scene template of the target game scene from a preset scene template database according to an identifier of a user-selected scene template;

a scene object obtaining sub-module for obtaining a scene object of the target game scene from a preset scene object database according to an identifier of a user-selected scene object;

a location determining sub-module for determining the location of the scene object in the target game scene within the scene template of the target game scene according to an edition instruction or a saving instruction for the scene object in the target game scene;

a scene object displaying sub-module for obtaining display effect of the scene object in the target game scene from the preset scene object display effect database according to the scene object in the target game scene and the location of the scene object in the target game scene within the scene template of the target game scene, and displaying, in the scene template of the target game scene, the scene object in the target game scene in a manner of the obtained display effect according to the determined location of the scene object; and a scene object rendering sub-module for determining the illumination effect of the scene object in the target game scene according to the determined location of the scene object and the illumination parameters of the game engine itself, and rendering the scene object in the target game scene in a manner of the determined illumination effect and thus obtaining the target game scene.

In view of the above, in the solutions provided by embodiments of the present invention, the generation of target game scene comprises: obtaining, from a preset scene template database and a preset scene object database, a scene template and a scene object of the target game scene respectively according to user's selection, determining the location of the scene object in the scene template according to an edition instruction or a saving instruction for the scene object, and then obtaining, from a preset scene object display effect database, display effect of the scene object according to the scene object and the location thereof in the scene template, and displaying, in the scene template, the scene object in a manner of the obtained display effect, and further determining the illumination effect of the scene object according to the location of the scene object and illumination parameters of a game engine itself, and rendering the scene object in a manner of the determined illumination effect of the scene object. It can be seen that the display effect of a scene object is determined according to a preset scene object display effect database, and the illumination effect of the scene object is determined according to the illumination parameters of a game engine itself. Thus, when generating a target game scene, only the location information of a scene object in a scene template, instead of information related to display effect and illumination effect of the scene object, are required to be stored. Moreover, a scene template and a scene object are also obtained according to preset databases, thus only the identifier of the scene template and the identifier of the scene object are required to be stored when generating a target game scene. In view of the above, the solutions provided by the embodiments of the present invention can be applied to generate game scene data so as to greatly decrease the amount of data of the generated game scene.

BRIEF DESCRIPTION OF THE DRAWINGS

In order to describe the technical solutions in the embodiments of the present invention or in the prior art more clearly, appended drawings required to describe the embodiments of the present invention or in the prior art will be briefly described below. Obviously, the appended drawings described below are only for some embodiments of the present invention, and those skilled in the art can obtain other drawings according to these drawings without any creative effort.

DETAILED DESCRIPTION

Technical solutions in the embodiments of the present invention will be described below clearly and completely in combination with the appended drawings of the embodiments of the present invention. Obviously, the described embodiments are only some of the embodiments of the present invention, rather than all of the embodiments. Any other embodiment obtained based on the embodiments of the present invention by those skilled in the art without doing creative works falls into the protection scope of the present invention.

Figure 1:
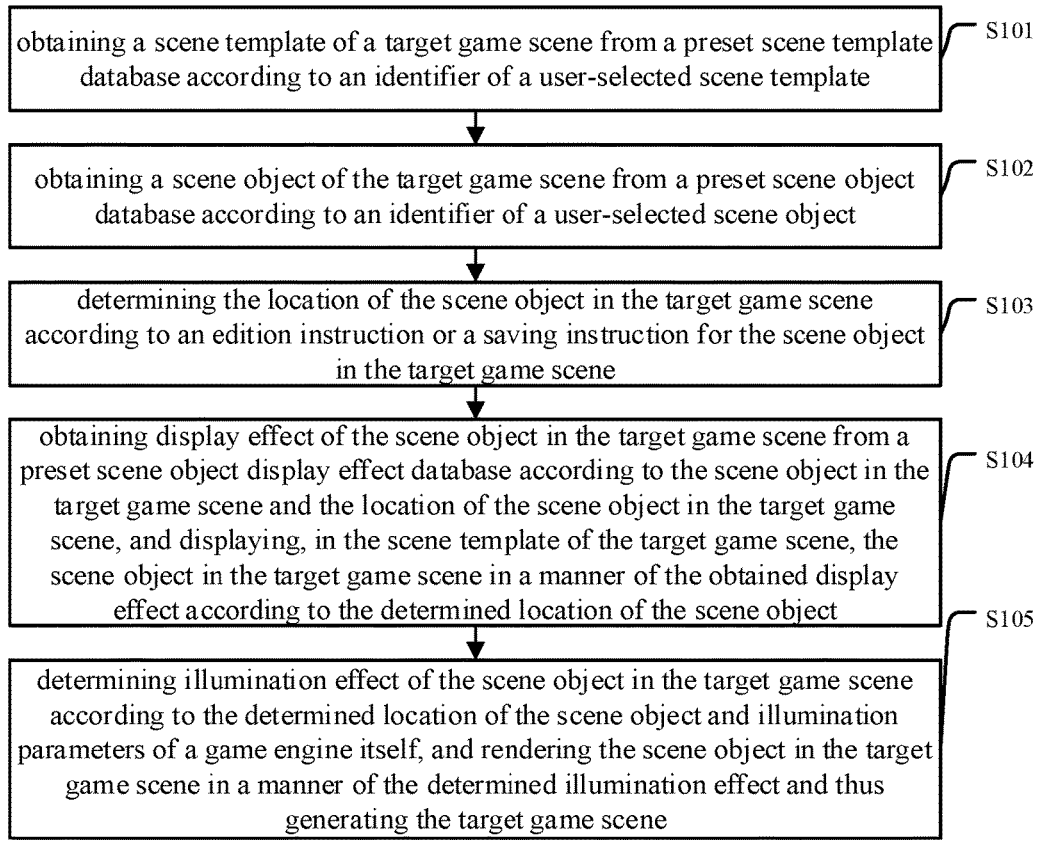
FIG. 1 is a schematic flowchart of a method for generating game data provided by an embodiment of the present invention.

FIG. 1 is a schematic flowchart of a method for generating game data provided by an embodiment of the present invention, the method comprises:

S101: obtaining a scene template of a target game scene from a preset scene template database according to an identifier of a user-selected scene template.

A game scene can be simply understood as game environment in which the corresponding game character is when a user is playing a game via a game client, such as game maps for battling set by a system or each user in battle games, and room arrangements and game characters etc., arranged by users in a pretending game and the like.

In a specific embodiment, when a game scene is a game map, a game client can provide users with a function of designing game maps by themselves. A user can activated the map edition function after opening the client. Normally, the game client will provide the user with one scene template, and then the user can draw terrains on the scene template, for example, by adding a tree, disposing a box, setting the birth place of a monster. After the user finishes editing the map, the edited map can be stored in a local folder or be uploaded to a server by the game client. In order to realize a map edition function, it is necessary for a game client to preset a game template database in which scene templates are stored. Wherein, a scene template can be a scene template with trenches and a scene template with buildings and the like. Each scene template corresponds to a number, i.e., the identifier of the scene template.

When generating a game scene, it is firstly required to determine the scene background of this game scene, wherein the scene background can be understood as a background content picture of the game scene, such as a building room without furnishings, a thatch room without furnishings, a trench without barriers. It can be understood that the related scene backgrounds for games can often be extracted beforehand. Thus, in the solutions provided by the embodiments of the present application, scene backgrounds that may be used by a user are stored into a database in the form of scene templates. In this way, when game scenes are generated, a user can edit complex and changeable game scenes by directly selecting scene templates stored in this database. Moreover, the number of scene templates stored in this database is larger than or equal to 1.

It can be seen from the above description that, the scene background of a scene object can be understood as a background content picture of the scene object. When the game scene is generated, only after the background content picture of the game scene is determined, scene objects, such as barriers, furnishings, objects, can be further determined based on the determined background content picture so as to finish the generation of game scenes.

As described above, after a user selects a scene template, a client can select, from a list of identifiers of templates, the identifier corresponding to the scene template. Moreover, it is also possible to preset a default scene template. If a user does not select an identifier value from the list of identifiers of scene templates, it can be assumed that the user has selected a default scene template.

S102: obtaining a scene object of the target game scene from a preset scene object database according to an identifier of a user-selected scene object.

The game scene often comprises various scene objects in addition to a scene background. When generating a game scene, these scene objects are often added on a scene background according to user's selection. For example, for a battle game, scene objects can be barriers, blasting areas and the like; for a pretending game, scene objects can be sofas, cushions, clothes and the like.

In a preferred implementation of the present invention, the scene objects described above can be objects.

It can be understood that, for a game, scene objects that can be provided to users are often definite. Thus, in the solutions provided by the present embodiment, the scene objects that can be provided to users are stored into a database. In this way, it is possible for a user to view the content contained in the database to select the scene objects needed.

Further, in actual applications, different users may have different levels or different interests for one game. In this case, it is possible to provide targeted identifiers of user-selectable the scene objects to users according to actual conditions. For example, various scene object packages are provided to users for selection and download by users.

In a preferred implementation of the present invention, the step of obtaining a scene object of the target game scene from a preset scene object database according to an identifier of a user-selected scene object can be carried out by determining identifiers of user-selectable scene objects according to user attribute information of a user and obtaining the scene object in the target game scene from the preset scene object database according to an identifier of a scene object selected by the user from the identifiers of the user-selectable scene objects.

In particular, the user-selectable scene objects determined according to user attribute information of a user can be all scene objects in a preset scene object database, and also can be a part of scene objects in a preset scene object database, the user-selectable scene objects will be described for two different cases below.

In the first case, in which the determined user-selectable scene objects are all scene objects in a preset scene object database, the number of user-selectable scene objects is large and it is comparatively time consuming for users to select them.

In a specific implementation, it is possible to select several scene objects according to difficulty levels of usage of various scene objects and user level of a user and to provide the user with identifiers of these selected scene objects preferably.

In another implementation, it is possible to collect history data generated in processes of generating scene objects or playing a game by a user, analyze the collected data, select several scene objects from a preset scene object database according to analysis results and provide the user with identifiers of these selected scene objects preferably. For example, scene objects are sorted according to their popularity levels rated by all users in the whole network or scene objects used by a user in a recent period of time are sorted according to a time order.

In the second case, in which the determined user-selectable scene objects are a part of scene objects in a preset scene object database, it is possible to determine the object category to which user-selectable scene objects belong according to one or more information, such as category of a user, the corresponding character attributes of the user, and history data generated in processes of generating scene objects or playing a game by the user, and then provide the user with identifiers of scene objects belonging to this object category in the preset scene object database.

For example, in a battle game, if it is found that a user is more interested in tactics according to history data generated when the user is in the process of playing a game, it can be determined that user-selectable scene objects are scene objects of a battle structure type and identifiers of scene objects of this type in a preset scene object database are provided to the user; and if it is found that a user requires a higher level of aesthetics to scene objects according to history data of user's scene object, it can be determined that user-selectable scene objects are scene objects with abundant textures and diversified morphology and identifiers of scene objects of this type in a preset scene object database are provided to the user.

It should be noted that the above examples are only illustrative and the specific instances of user-selectable scene objects determined according to user attribute information of users in the actual applications are not limited to the examples described above, to which the present application is not limited.

In an alternative implementation of the present invention, the scene object described above can be a part of scene objects provided in UED edition maps, such as scene objects in 3D view and view angle, scene objects of a basic body, scene objects of stuff and scene objects of weather and the like.

It should be noted that the present application is not limited to the execution sequence between S101 and S102, wherein S101 can be executed before, after or simultaneously with S102.

S103: determining the location of the scene object in the target game scene according to an edition instruction or a saving instruction for the scene object in the target game scene.

It is also necessary to perform an edition operation for a scene object after the scene object is obtained, so as to adjust locations of various scene objects in a scene template. Wherein, the edition operation for a scene object by a user can include moving, rotating, zooming, copying, pasting, deleting and the like, and moreover, the edition operation can also be digging, covering and the like, the present invention does not limit the specific form of the edition operation.

It should be noted that, the location information of a scene object in a target game scene comprises not only coordinate information on the scene object, but also information such as orientation of the scene object.

S104: obtaining display effect of the scene object in the target game scene from a preset scene object display effect database according to the scene object in the target game scene and the location of the scene object in the target game scene, and displaying the scene object in the target game scene in the scene template of the target game scene in a manner of the obtained display effect according to the determined location of the scene object.

It can be understood that each scene object can be provided with a plurality of display effects. It is possible to predefine a display condition for each display effect of the scene object and store these display effects in a database in the actual applications. During the process of generating a game scene, if a display condition for a certain display effect of the scene object is satisfied, a corresponding display effect is obtained from the database.

In a preferred implementation of the present invention, display conditions for scene objects can be display conditions related to location information of the scene objects.

In particular, a scene object can be flame with at least two display effects as follows: a rest state and a firing state, wherein, the display condition corresponding to the rest state is that the flame is in a non-sky area, and the display condition corresponding to the firing state is that the flame is in a sky area. When generating a game scene, if the flame of this scene object is on the ground area in the scene template, which is obviously a non-sky area, and then the display condition corresponding to the rest state is satisfied, then the flame is displayed in the rest state; and if the flame of this scene object is in the sky area in the scene template, which obviously satisfies the display condition corresponding to the rest state, then the flame is displayed in the firing state.

Of course, the above description of the present application is only illustrative, in the actual applications, the display conditions of scene objects cannot only be display conditions related to locations of scene objects, to which the present application is not limited.

S105: determining illumination effect of the scene object in the target game scene according to the determined location of the scene object and illumination parameters of a game engine itself, and rendering the scene object in the target game scene in a manner of the determined illumination effect and thus generating the target game scene.

It should be noted that the present application is not limited to the execution sequence between the displaying a scene object of a target game scene in a scene template of the target game scene and the rendering the scene object of the target game scene.

It is also possible to store, after a target game scene is generated, scene data of the target game scene so as to facilitate sharing this game scene to other users and re-editing this game scene. In view of this, in a preferred implementation of the present invention, the method for generating game data described above can further comprise:

generating, according to the generated target game scene described above, corresponding scene data of target game scene, wherein, the scene data of the target game scene at least comprises: an identifier of a scene template of the target game scene, an identifier of a scene object in the target game scene and the location information of the scene object in the target game scene; and then storing the scene data.

In the best preferred embodiment, the scene data of the target game scene may only include an identifier of a scene template of the target game scene, an identifier of a scene object in the target game scene and the location information of the scene object in the target game scene, and then the scene data are stored such that the amount of data is small and easy for distribution. Although only an identifier of a scene template of a target game scene, an identifier of a scene object in the target game scene and the location information of the scene object in the target game scene are stored when storing data of the target game scene, it can be seen from the previous description that, it is possible to reconstruct the target game scene described above by means of these stored information according to the preset scene template database, the preset scene object database, the preset scene object display effect database and the illumination parameters of the game engine itself, such that the amount of data for a target game scene to be stored is decreased significantly. The storage space by the among of data can be as small as the order of KB, thereby the time that it takes to upload a target game scene to a server or other clients by a user through the client or the time that it takes to download a game scene from a server or other clients can be reduced significantly.

It can be seen from the above description that, a preset scene template database, a preset scene object database, and a preset scene object display effect database are utilized when generating game scenes with solutions provided by various embodiments described above. Since several databases described above can be understood as the encapsulation of various elements for constituting game scenes, or can be understood as the encapsulation of scene object attributes and the like, in this way, when the several databases described above are available, it is only necessary to transmit identifiers of scene templates, identifiers of scene objects, instead of specific contents of scene templates, specific contents of scene objects and the specific contents of display effects of scene objects during the communication between different clients and servers. In this way, the concerned clients and server will still reconstruct the game scene accurately.

Moreover, a plurality of game scenes may be generated and stored locally during the process of playing a game by a user, although only one game scene stored locally is currently used, and it is possible to use other game scenes stored locally when user's requirement changes. In this case, scenes that a user needs can only be reconstructed according to information such as an identifier of a scene template of a locally stored game scene, an identifier of a scene object, the location of the scene object, although databases needed during scene reconstruction process are located locally, it still takes some time. In view of the above specific case, in a specific implementation of the present invention, the method for generating game data can further comprise:

detecting whether current remaining storage space is larger than a preset threshold, if yes, which means that current remaining storage space is sufficient, it is possible to store all data of the target game scene in this case. In this way, when reconstructing the target game scene, it is not necessary to obtain other information required one by one to reconstruct the target game scene according the identifier of the scene template of a target game scene, the identifier of the scene object and the location of the scene object, thereby increasing the speed of displaying the target game scene for users.

Further, in a preferred implementation of the present invention, the method for generating game data described above can further comprise: performing an edition operation for a target game scene. After the target game scene is edited by a user, its corresponding scene data may change, so it is also necessary to update scene data on the target game scene according to the edition operation of the user.

Wherein, the performing an edition operation for a target game scene can comprise: changing the location of an existing scene object, deleting an existing scene object and adding a scene object and the like, to which the present application is not limited.

Since a plurality of game scenes can be stored locally, in an alternative implementation of the present invention, scene data of a target game scene can also comprise an identifier of the target game scene. In this way, it is possible to distinguish the target game scene from other game scenes by means of the identifier of the target game scene. For example, the identifier of a target game scene can be a user-defined file name.

In view of the above, in the solutions provided by embodiments of the present invention, the generation of target game scene comprises: obtaining, from a preset scene template database and a preset scene object database, a scene template and a scene object of the target game scene respectively according to user's selection, determining the location of the scene object in the scene template according to an edition instruction or a saving instruction for the scene object, and then obtaining, from a preset scene object display effect database, display effect of the scene object according to the scene object and the location thereof in the scene template, and displaying, in the scene template, the scene object in a manner of the obtained display effect, and further determining the illumination effect of the scene object according to the location of the scene object and illumination parameters of a game engine itself, and rendering the scene object in a manner of the determined illumination effect of the scene object. It can be seen that the display effect of a scene object is determined according to a preset scene object display effect database, and the illumination effect of the scene object is determined according to the illumination parameters of a game engine itself. Thus, when generating a target game scene, only the location information of a scene object in a scene template, instead of information related to display effect and illumination effect of the scene object, are required to be stored. Moreover, a scene template and a scene object are also obtained according to preset databases, thus only the identifier of the scene template and the identifier of the scene object are required to be stored when generating a target game scene. In view of the above, the solutions provided by the embodiments of the present invention can be applied to generate game scene data so as to greatly decrease the amount of data of the generated game scene.

Take a game map as an example of a game scene. Some Internet games in the prior art (comprising console games with a Networking function) is provided with a map making function. Since the map file information comprises contents of all aspects such as objects, logic, map structures, illumination and the like, the map file is large and it is only possible for a plurality of players to join a battle when all contents of this map are manually put into a specific file folder after downloaded in communities, forums or games and then the map file is called by the local client. Moreover, bandwidths and time costs for uploading map files and for other players to download map files are large and the waiting time is long, and thus it is not suitable for popularizing. The present application effectively resolves the problems caused by large map files that storing, uploading and sharing of battles is extremely slow and inconvenient, and sizes of map files generated in the present application are in the order of KB and very small.

Another specific implementation of the present application provides another method for generating game data, which specifically comprises:

a client obtaining a target game scene, and extracting, from the target game scene, an identifier of a scene template of the target game scene, an identifier of a scene object in the target game scene and location information of the scene object in the target game scene, and generating, according to the extracted information, scene data for reconstructing the target game scene.

Because the location information of a scene object in the target game scene can be used in combination with illumination parameters of a game engine itself to determine illumination effect of the scene object in the target game scene, the identifier of the scene object in the target game scene can be used in combination with the location information of the scene object in the target game scene and a preset scene object display effect database to determine display effect of the scene object in the target game scene. In this way, even if no display effects and illumination effects of scene objects are contained in the scene data, it is still possible to successfully reconstruct a template game scene. The amount of data is smaller as compared with scene data for reconstructing a game scene generated in the prior art, which facilitates the upload and download of scene data of the game scene.

Based on the method for generating game data described above, embodiments of the present invention also provide a method for uploading game data.

Figure 2:
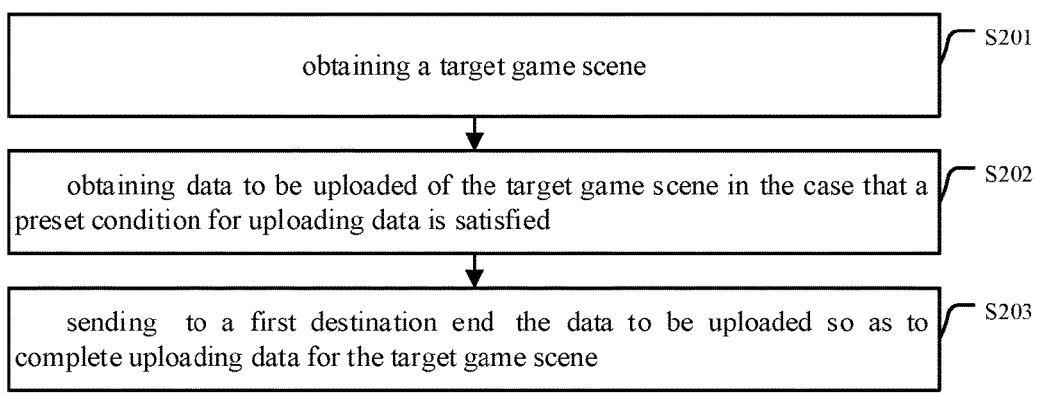
FIG. 2 is a schematic flowchart of a method for uploading game data provided by an embodiment of the present invention.

FIG. 2 is a schematic flowchart of a method for uploading game data provided by an embodiment of the present invention, the method comprises:

S201: obtaining a target game scene.

In a preferred implementation of the present invention, the target scene object can be obtained by the following steps which specifically comprise:

obtaining a scene template of the target game scene from a preset scene template database according to an identifier of a user-selected scene template;

obtaining a scene object of the target game scene from a preset scene object database according to the identifier of the user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in the manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus obtaining the target game scene.

The method of obtaining a target game scene provided in this preferable implementation is the same with the method of obtaining a target game scene provided in the embodiment as shown in FIG. 1 and thus will not be described in detail here.

Moreover, the target game scene can be obtained by huge and complex UED edition maps in the prior art and the present application is not limited to the specific way of obtaining a target game scene.

S202: obtaining data to be uploaded of the target game scene in the case that a preset condition for uploading data is satisfied.

Wherein, the data to be uploaded at least comprises: an identifier of a scene template of the target game scene, an identifier of a scene object in the target game scene and location information of the scene object in the target game scene, and wherein the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene.

It can be understood that a game may have different game modes with the advance of game progress when the game is played by a user, and thus, game scenes generated via a client by a user are game scenes for different game modes. Further, in order to achieve better game effects, it is possible to set different verification conditions for various game modes so as to ensure that game scenes generated via clients by users according to their requirements satisfy requirements.

In particular, the step of obtaining data to be uploaded of the target game scene in the case that a preset condition for uploading data is satisfied can be carried out by verifying whether the target game scene satisfies a preset verification condition corresponding to a current game mode and if yes, obtaining the data to be uploaded of the target game scene.

In an alternative implementation of the present invention, information for verification can be extracted from target game scenes according to a preset verification condition. For example, when a target game scene is a battle map, information for verification can be camps, birth points, map size and the like, this information, after being extracted, is matched with a preset verification condition corresponding to the current game mode, and if match is successful, it is indicated that verification passes.

In another alternative implementation of the present invention, it is possible for a client to verify whether target game scenes satisfy a preset verification condition corresponding to the current game mode according to verification results from a server. In particular, a client extracts information for verification from a target game scene, and sends the extracted information and the current game mode to a server. The server, after receiving the above information, verifies whether the information extracted by the client satisfies a preset verification condition corresponding to the current game mode and feedbacks the verification result to the client, the client then performs verification according to received verification result. When verification is carried out by the method provided in this implementation, it is only necessary to change, if desired, preset verification conditions in servers, which can effectively avoid instances in which game scene data uploaded by clients do not satisfy requirements of current game modes for example due to that verification conditions are not timely synchronized.

S203: sending to a first destination end the data to be uploaded so as to complete uploading data for the target game scene.

Wherein, the first destination end described above can be a server and can also be a client, to which the present invention is not limited.

It can be known from above that, in the solutions provided by the present embodiment, a client only uploads an identifier of a scene template of a target game scene, an identifier of a scene object in the target game scene and location information of the scene object in the target game scene when the client uploads data of the target game scene to a destination end. However, it can still fulfill the upload of data on the target game scene, since the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene. Obviously, compared with prior art that it is required to upload all data of a game scene during the uploading of game scene data, the upload of game data with solutions provided by the present embodiment can largely decrease the amount of data during uploading game data and reduce the time that it takes to upload game scene data.

In the actual applications, users can not only generate game scenes by clients and upload the generated game scene data to destination ends so as to share the generated game scenes, but also download the game scene data generated by other users through clients.

Figure 3:
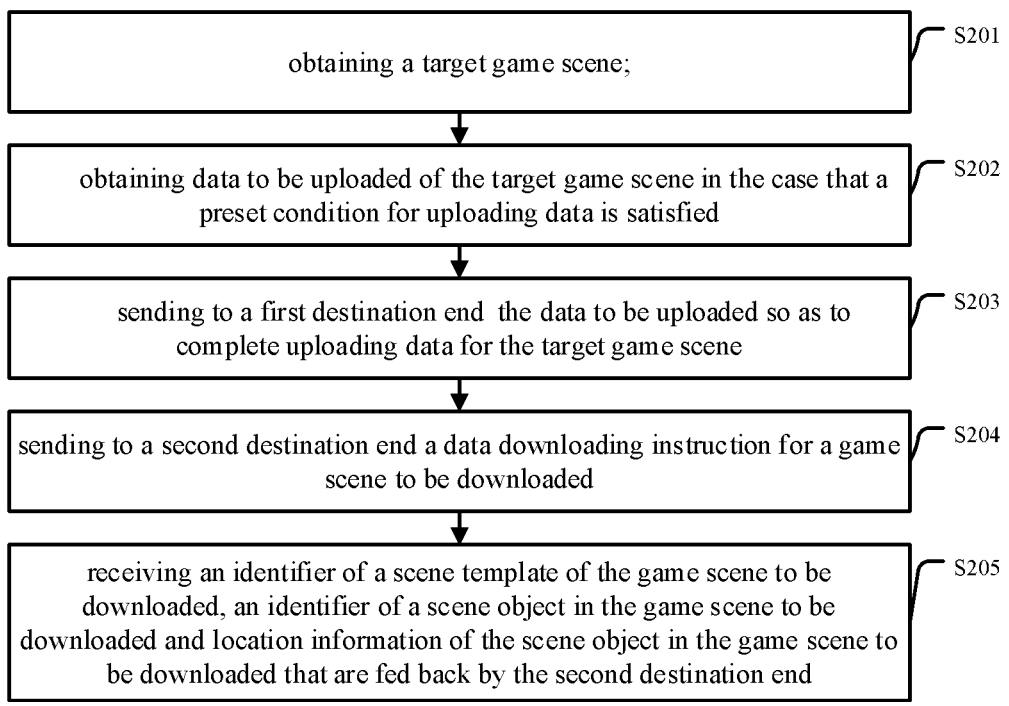
FIG. 3 is a schematic flowchart of another method for uploading game data provided by an embodiment of the present invention.

In a specific implementation of the present invention with reference to FIG. 3, which provides schematic flowchart of another method for uploading game data, as compared to the previous embodiment, the method for uploading game data described above in this embodiment further comprises:

S204: sending to a second destination end a data downloading instruction for a game scene to be downloaded.

The second destination end described above can be, and can also not be, the same with the first destination end described above. Moreover, the second destination end can be a server and can also be a client, to which the present application is not limited.

The data downloading instruction is at least required to comprise an identifier of a game scene to be downloaded. Of course, it can further comprise other information, to which the present invention is not limited.

S205: receiving an identifier of a scene template of the game scene to be downloaded, an identifier of a scene object in the game scene to be downloaded and location information of the scene object in the game scene to be downloaded that are fed back by the second destination end.

After a client receives an identifier of a scene template of the game scene to be downloaded, an identifier of a scene object in the game scene to be downloaded and location information of the scene object in the game scene to be downloaded that are fed back by the second destination end, it is possible to first only store the data locally rather than displaying the game scene to be downloaded to users, and to display the game scene to be downloaded described above to users only when display is needed.

When displaying the game scene to be downloaded described above to users, it is necessary to firstly reconstruct the game scene to be downloaded according to information fed back by the second destination end described above and then it is possible to display the game scene to be downloaded to users.

In particular, in a preferred implementation of the present invention, after receiving an identifier of a scene template of the game scene to be downloaded, an identifier of a scene object in the game scene to be downloaded and location information of the scene object in the game scene to be downloaded that are fed back by the second destination end, the method further comprises:

obtaining the scene template of the game scene to be downloaded from a preset scene template database according to the identifier of the scene template of the game scene to be downloaded;

obtaining the scene object in the game scene to be downloaded from a preset scene object database according to the identifier of the scene object in the game scene to be downloaded;

determining illumination effect of the scene object in the game scene to be downloaded according to the location information of a scene object in the game scene to be downloaded and illumination parameters of the game engine itself;

determining display effect of the scene object in the game scene to be downloaded according to the scene object in the game scene to be downloaded, location information of the scene object in the game scene to be downloaded and the preset scene object display effect database; and displaying, in the scene template of the game scene to be downloaded, the scene object in the game scene to be downloaded in a manner of the determined display effect of the scene object, and rendering the scene object in the game scene to be downloaded in a manner of the determined illumination effect of the scene object, according to the location of the scene object in the game scene to be downloaded.

The above steps realize the process of reconstructing game scenes to be downloaded according to information fed back by a second destination end.

It should be noted that the present application is not limited to the execution sequence between S204, S205 and S201, S202, S203, the steps of S204, S205 can be executed before, after or simultaneously with S201, S202, S203.

It should be noted that there are two ways to download data and reconstruct game scenes by applying the solutions provided by the embodiments of the present invention.

In the first way: after sending to a destination end a data downloading instruction for a game scene to be downloaded, a client first obtains all the required information from the destination end, including an identifier of a scene template of the game scene to be downloaded, an identifier of a scene object in the game scene to be downloaded and location information of the scene object in the game scene to be downloaded that are fed back by the first destination end, for reconstructing the game scene to be downloaded, and then reconstructs the game scene to be downloaded according to the downloaded information described above. Wherein, the reconstruction of a game scene to be downloaded according to the downloaded information described above can be automatically initiated after the client detects that data download is complete, and can also be initiated after a user's instruction is received, for example, a user clicked a "scene display" button.

In the second way, after sending to a destination end a data downloading instruction for a game scene to be downloaded, a client first obtains a part of the required information for reconstructing the game scene to be downloaded. In this way, the client can first start to reconstruct the game scene to be downloaded according to the downloaded information and then continue to download other required information for reconstructing the game scene to be downloaded during the reconstruction, which presents users with a process of reconstructing the game scene in real time and leads to a better user experience. For example, a client downloads a game map from a destination end as follows: after sending a downloading instruction to a destination end, the client obtains the template identifier of the game map, and starts to build a room corresponding to the game map according to the template identifier, and then continues to obtain the identifiers of objects contained in the room from the destination end during the process of building the room, and after the building of the room completes, establishes various objects in the room successively and establishes illumination effects, display effects and the like of objects according to information such as locations of objects and the like.

It can be seen from above that in the solution provided by the present embodiment, when downloading a game scene to be downloaded, it is only necessary to download the identifier of a scene template of a game scene to be downloaded, the identifier of a scene object in the game scene to be downloaded and location information of the scene object in the game scene to be downloaded. Although only the above information is downloaded, it is possible to uniquely reconstruct the game scene to be downloaded according to a preset scene object display effect database and illumination parameters of a game engine itself. As compared with downloading all data of game scenes to be downloaded, the solution provided by the present embodiment can not only greatly decrease the amount of the uploaded game scene data, but also greatly decrease the amount of the downloaded game scene data, and thus reducing the time it takes to download game scene data.

The processes of downloading data of a game scene and reconstructing the game scene by a client will be described in detail below with a specific example.

Figure 4:
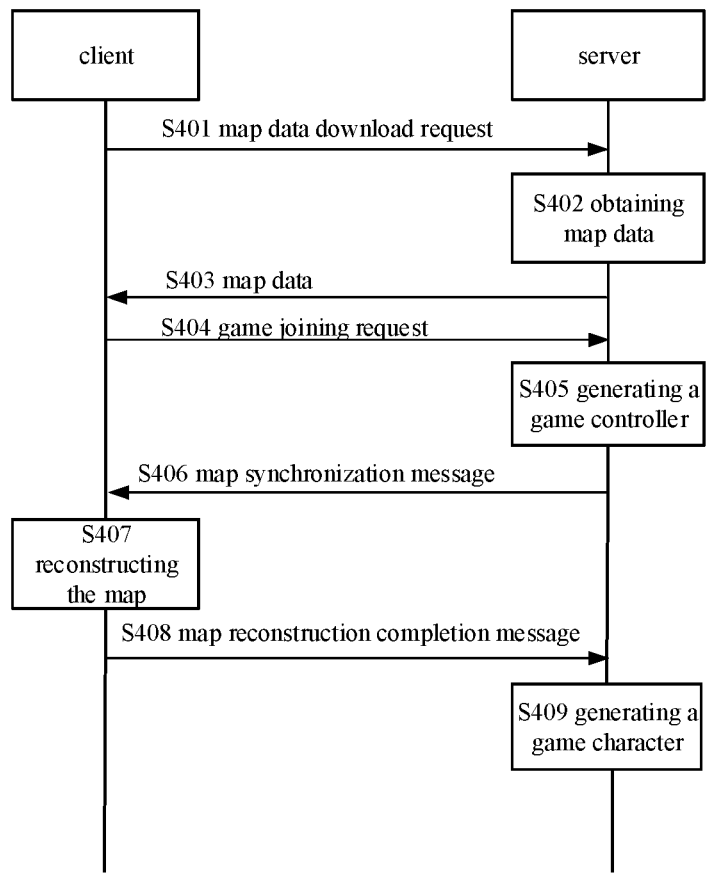
FIG. 4 is a schematic signaling flowchart for downloading map data provided by an embodiment of the present invention.

The game scene in this example is a game map, referring to FIG. 4, which provides a schematic signaling flowchart of downloading map data.

A client sends a map data download request to a server (S401); the server, after receiving the map data download request, obtains a map template identifier of map data, identifiers of map objects in the map and locations of map objects in the map (S402), the sever sends the obtained above information to the client (S403); the client sends a game joining request after receiving the above information (S404); the server, after receiving the game joining request sent by the client, performs information verification, confirms the successful join of the client in the game and generates a game controller for the corresponding user of the client (S405) so as to control the corresponding user's game character of the client by the generated character controller; the server sends a map synchronization message to the client (S406); the client, after receiving the map synchronization message, reconstructs the map with reference to the solution for reconstructing a scene as shown in FIG. 3 according to the information received in step S402 (S407), and sends a map reconstruction completion message to the server after the reconstruction of the map completes (S408); the server, after receiving the map reconstruction completion message, generates the game character corresponding to the map (S409) so as to cause the corresponding user of the client to smoothly start to enter the game.

Correspondingly to the method for generating game data previously described, embodiments of the present invention also provide a device for generating game data.

Figure 5:
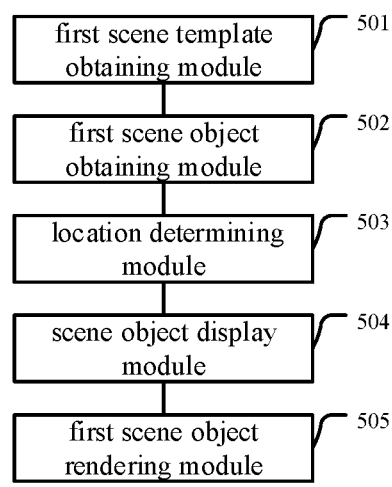
FIG. 5 is a structural schematic view of a device for generating game data provided by an embodiment of the present invention.

FIG. 5 is a structural schematic view of a device for generating game data provided by an embodiment of the present invention, the device comprises:

a first scene template obtaining module 501 for obtaining a scene template of a target game scene from a preset scene template database according to an identifier of a user-selected scene template;

a first scene object obtaining module 502 for obtaining a scene object of the target game scene from a preset scene object database according to an identifier of a user-selected scene object;

a location determining module 503 for determining the location of the scene object in the target game scene according to an edition instruction or a saving instruction for the scene object in the target game scene;

a scene object display module 504 for obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and a first scene object rendering module 505 for determining illumination effect of the scene object in the target game scene according to the determined location of the scene object and illumination parameters of a game engine itself, and rendering the scene object in the target game scene in a manner of the determined illumination effect and thus generating the target game scene.

In a preferred implementation of the present invention, the device for generating game data can further comprise:

a scene data generating module for generating scene data of the target game scene according to the target game scene, wherein, the scene data of the target game scene at least comprises: an identifier of a scene template of the target game scene, an identifier of a scene object in the target game scene and location information of the scene object in the target game scene; and a first data storage module for storing the scene data.

Based on the preferred embodiment described above, in a specific implementation of the present invention, the device for generating game data can further comprise:

a storage space detecting module for detecting whether current remaining storage space is larger than a preset threshold; and a second data storage module for storing all data of the target game scene in case that the detection result from the storage space detecting module is true.

In particular, the device for generating game data can also comprise:

an edition operation performing module for performing an edition operation for the target game scene; and a scene data updating module for updating the scene data according to the edition operation.

In particular, the first scene object obtaining module comprises:

a scene object identifier determining sub-module for determining identifiers of user-selectable scene objects according to user attribute information of a user; and a scene object obtaining sub-module for obtaining the scene object in the target game scene from the preset scene object database according to an identifier of the scene object selected by a user from identifiers of the user-selectable scene objects.

In view of the above, in the solutions provided by embodiments of the present invention, the generation of target game scene comprises: obtaining, from a preset scene template database and a preset scene object database, a scene template and a scene object of the target game scene respectively according to user's selection, determining the location of the scene object in the scene template according to an edition instruction or a saving instruction for the scene object, and then obtaining, from a preset scene object display effect database, display effect of the scene object according to the scene object and the location thereof in the scene template, and displaying, in the scene template, the scene object in a manner of the obtained display effect, and further determining the illumination effect of the scene object according to the location of the scene object and illumination parameters of a game engine itself, and rendering the scene object in a manner of the determined illumination effect of the scene object. It can be seen that the display effect of a scene object is determined according to a preset scene object display effect database, and the illumination effect of the scene object is determined according to the illumination parameters of a game engine itself. Thus, when generating a target game scene, only the location information of a scene object in a scene template, instead of information related to display effect and illumination effect of the scene object, are required to be stored. Moreover, a scene template and a scene object are also obtained according to preset databases, thus only the identifier of the scene template and the identifier of the scene object are required to be stored when generating a target game scene. In view of the above, the solutions provided by the embodiments of the present invention can be applied to generate game scene data so as to greatly decrease the amount of data of the generated game scene.

A specific implementation of the present application provides another device for generating game data, which comprises:

a first game scene obtaining module for obtaining a target game scene; and a scene data generating module for extracting, from the target game scene, an identifier of a scene template of the target game scene, an identifier of a scene object in the target game scene and location information of the scene object in the target game scene, and generating, according to the extracted information, scene data for reconstructing the target game scene.

Because the location information of a scene object in the target game scene can be used in combination with illumination parameters of a game engine itself to determine illumination effect of the scene object in the target game scene, the identifier of the scene object in the target game scene can be used in combination with the location information of the scene object in the target game scene and a preset scene object display effect database to determine display effect of the scene object in the target game scene. In this way, even if no display effects and illumination effects of scene objects are contained in the scene data, it is still possible to successfully reconstruct a template game scene. The amount of data is smaller as compared with scene data for reconstructing a game scene generated in the prior art, which facilitates the upload and download of scene data of the game scene.

Correspondingly to the method for uploading game data previously described, embodiments of the present invention also provide a device for uploading game data.

Figure 6:
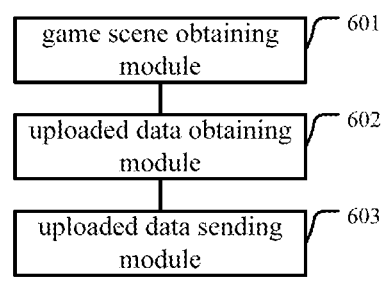
FIG. 6 is a structural schematic view of a device for uploading game data provided by an embodiment of the present invention.

FIG. 6 is a structural schematic view of a device for uploading game data provided by an embodiment of the present invention, the device comprises:

a game scene obtaining module 601 for obtaining a target game scene;

an uploaded data obtaining module 602 for obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, and wherein the location information of the scene object in the target game scene is used in combination with illumination parameters of a game engine itself to determine illumination effect of the scene object in the target game scene, and wherein the identifier of the scene object in the target game scene is used in combination with the location information of the scene object in the target game scene and the preset scene object display effect database to determine display effect of the scene object in the target game scene; and an uploaded data sending module 603 for sending to a first destination end the data to be uploaded, so as to complete uploading data for the target game scene.

In particular, the uploaded data obtaining module 602 can comprise:

a game scene verifying sub-module for verifying whether the target game scene satisfies a preset verification condition corresponding to a current game mode; and an uploaded data obtaining sub-module for obtaining the data to be uploaded of the target game scene in the case that verification result from the game scene verifying sub-module is true.

In particular, the game scene obtaining module 601 can comprise:

a scene template obtaining sub-module for obtaining a scene template of the target game scene from a preset scene template database according to an identifier of a user-selected scene template;

a scene object obtaining sub-module for obtaining a scene object of the target game scene from a preset scene object database according to an identifier of a user-selected scene object;

a location determining sub-module for determining the location of the scene object in the target game scene according to an edition instruction or a saving instruction for the scene object in the target game scene;

a scene object displaying sub-module for obtaining display effect of the scene object in the target game scene from the preset scene object display effect database according to the scene object in the target game scene and the location of the scene object in the target game scene, and displaying, in the scene template of the target game scene, the scene object in the target game scene in a manner of the obtained display effect according to the determined location of the scene object; and a scene object rendering sub-module for determining the illumination effect of the scene object in the target game scene according to the determined location of the scene object and the illumination parameters of the game engine itself, and rendering the scene object in the target game scene in a manner of the determined illumination effect and thus obtaining the target game scene.

It can be known from above that, in the solutions provided by the present embodiment, a client only uploads an identifier of a scene template of a target game scene, an identifier of a scene object in the target game scene and location information of the scene object in the target game scene when the client uploads data of the target game scene to a destination end. However, it can still fulfill the upload of data on the target game scene, since the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene. Obviously, compared with prior art that it is required to upload all data of a game scene during the uploading of game scene data, the upload of game data with solutions provided by the present embodiment can largely decrease the amount of data during uploading game data and reduce the time that it takes to upload game scene data.

Figure 7:
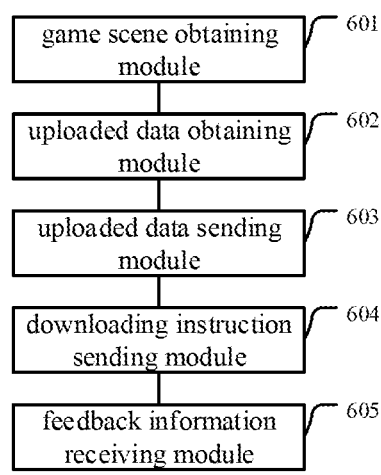
FIG. 7 is a structural schematic view of another device for uploading game data provided by an embodiment of the present invention.

In a specific implementation of the present invention with reference to FIG. 7, which provides a structural schematic view of another device for uploading game data, as compared to the previous embodiment, the method for uploading game data described above in this embodiment further comprises:

a downloading instruction sending module 604 for sending to a second destination end a data downloading instruction for a game scene to be downloaded; and a feedback information receiving module 605 for receiving an identifier of a scene template of the game scene to be downloaded, an identifier of a scene object in the game scene to be downloaded and location information of the scene object in the game scene to be downloaded that are fed back by the second destination end.

Preferably, the device for upload game data can also comprise:

a second scene template obtaining module for obtaining, after receiving the information received by the feedback information receiving module 605, the scene template of the game scene to be downloaded from a preset scene template database according to the identifier of the scene template of the game scene to be downloaded;

a second scene object obtaining module for obtaining the scene object in the game scene to be downloaded from a preset scene object database according to the identifier of the scene object in the game scene to be downloaded;

an illumination effect determining module for determining, according to the location information of the scene object in the game scene to be downloaded and the illumination parameters of the game engine itself, illumination effect of the scene object in the game scene to be downloaded;

a display effect determining module for determining display effect of the scene object in the game scene to be downloaded according to the scene object in the game scene to be downloaded, the location information of the scene object in the game scene to be downloaded and the preset scene object display effect database; and a second scene object rendering module for displaying, in the scene template of the game scene to be downloaded, the scene object in the game scene to be downloaded in the manner of the determined display effect of the scene object and rendering the scene object in the game scene to be downloaded in the manner of the determined display effect of the scene object, according to the location of the scene object in the game scene to be downloaded.

It can be seen from above that in the solution provided by the present embodiment, when downloading a game scene to be downloaded, it is only necessary to download the identifier of a scene template of a game scene to be downloaded, the identifier of a scene object in the game scene to be downloaded and location information of the scene object in the game scene to be downloaded. Although only above information is downloaded, it is still possible to uniquely reconstruct the game scene to be downloaded according to a preset scene object display effect database and illumination parameters of a game engine itself. As compared with downloading all data of game scenes to be downloaded, the solution provided by the present embodiment can not only greatly decrease amount of the uploaded game scene data, but also greatly decrease amount of the downloaded game scene data, and thus reducing the time it takes to download game scene data.

The embodiments of the device are briefly described and the description of the embodiments of the method can be referred for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "comprise", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

It will be understood by one of ordinary skills in the art that all or part of the steps in the embodiments which implement the method described above can be implemented by instructing the related hardware with programs, which programs can be stored in a computer readable storage medium such as ROM/RAM, magnetic disk, optical disk.

The embodiments described above are just preferable embodiments of the present invention, and are not indented to limit the protection scope of the present invention. Any modifications, alternatives, improvements or the like within the spirit and principle of the present invention are comprised in the protection scope of the present invention.

What is claimed is:

1. A method for generating game data, characterized in that the method comprises:
   obtaining a scene template of a target game scene from a preset scene template database according to an identifier of a user-selected scene template;
   obtaining a scene object of the target game scene from a preset scene object database according to an identifier of a user-selected scene object;
   determining the location of the scene object in the target game scene according to an edition instruction or a saving instruction for the scene object in the target game scene;
   obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and
   determining illumination effect of the scene object in the target game scene according to the determined location of the scene object and illumination parameters of a game engine itself, and rendering the scene object in the target game scene in a manner of the determined illumination effect and thus generating the target game scene.

2. The method according to claim 1, characterized in that the method further comprises:
   generating scene data of the target game scene according to the target game scene, wherein, the scene data of the target game scene at least comprises: an identifier of a scene template of the target game scene, an identifier of a scene object in the target game scene and location information of the scene object in the target game scene; and
   storing the scene data.

3. The method according to claim 2, characterized in that the method further comprises:
   detecting whether current remaining storage space is larger than a preset threshold; and
   if yes, storing all data of the target game scene.

4. The method according to claim 2, characterized in that the method further comprises:
   performing an edition operation for the target game scene; and
   updating the scene data according to the edition operation.

5. The method according to claim 1, characterized in that the step of obtaining a scene object of the target game scene from a preset scene object database according to an identifier of a user-selected scene object comprises:
   determining identifiers of user-selectable scene objects according to user attribute information of a user; and
   obtaining the scene object in the target game scene from the preset scene object database according to an identifier of a scene object selected by the user from the identifiers of the user-selectable scene objects.

6. A method for generating game data, characterized in that the method comprises:
   obtaining a target game scene; and
   extracting, from the target game scene, an identifier of a scene template of the target game scene, an identifier of a scene object in the target game scene and location information of the scene object in the target game scene, and generating, according to the extracted information, scene data for reconstructing the target game scene, wherein illumination effect of the scene object in the target game scene can be determined according to the location information of the scene object in the target game scene and illumination parameters of a game engine itself, and display effect of the scene object in the target game scene can be determined according to a preset scene object display effect database and the identifier and location information of the scene object in the target game scene.

7. A method for uploading game data, characterized in that the method comprises:
   obtaining a target game scene comprising:
      obtaining a scene template of the target game scene from a preset scene template database according to an identifier of a user-selected scene template;
      obtaining a scene object of the target game scene from a preset scene object database according to an identifier of a user-selected scene object;
      determining the location of the scene object in the target game scene according to an edition instruction or a saving instruction for the scene object in the target game scene;
      obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object;
      determining illumination effect of the scene object in the target game scene according to the determined location of the scene object and illumination parameters of a game engine itself, and rendering the scene object in the target game scene in a manner of the determined illumination effect and thus obtaining the target game scene; and detecting whether current remaining storage space is larger than a preset threshold, and if yes, storing all data of the target game scene;

obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, and wherein, the location information of the scene object in the target game scene is used in combination with the illumination parameters of the game engine itself to determine the illumination effect of the scene object in the target game scene, the identifier of the scene object in the target game scene is used in combination with the location information of the scene object in the target game scene and the preset scene object display effect database to determine display effect of the scene object in the target game scene; and sending to a first destination end the data to be uploaded so as to complete uploading data for the target game scene.

8. The method according to claim 7, characterized in that the step of obtaining data to be uploaded of the target game scene in the case that a preset condition for uploading data is satisfied comprises:

verifying whether the target game scene satisfies a preset verification condition corresponding to a current game mode; and if yes, obtaining the data to be uploaded of the target game scene.

9. The method according to claim 7, characterized in that the method further comprises:

sending to a second destination end a data downloading instruction for a game scene to be downloaded; and receiving an identifier of a scene template of the game scene to be downloaded, an identifier of a scene object in the game scene to be downloaded and location information of the scene object in the game scene to be downloaded that are fed back by the second destination end.

10. The method according to claim 9, characterized in that after receiving an identifier of a scene template of the game scene to be downloaded, an identifier of a scene object in the game scene to be downloaded and location information of the scene object in the game scene to be downloaded that are fed back by the second destination end, the method further comprises:

obtaining the scene template of the game scene to be downloaded from a preset scene template database according to the identifier of the scene template of the game scene to be downloaded;

obtaining the scene object in the game scene to be downloaded from a preset scene object database according to the identifier of the scene object in the game scene to be downloaded;

determining illumination effect of the scene object in the game scene to be downloaded according to the location information of the scene object in the game scene to be downloaded and illumination parameters of the game engine itself;

determining display effect of the scene object in the game scene to be downloaded according to the scene object in the game scene to be downloaded, the location information of the scene object in the game scene to be downloaded and the preset scene object display effect database; and displaying, in the scene template of the game scene to be downloaded, the scene object in the game scene to be downloaded in a manner of the determined display effect of the scene object, and rendering the scene object in the game scene to be downloaded in a manner of the determined illumination effect of the scene object, according to the location of the scene object in the game scene to be downloaded.

11. A device for generating game data, characterized in that the device comprises:

a processor, and a memory, having computer-executable instructions stored thereon, which when executed by the processor perform the following operations:

obtaining a scene template of a target game scene from a preset scene template database according to an identifier of a user-selected scene template;

obtaining a scene object of the target game scene from a preset scene object database according to an identifier of a user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus generating the target game scene.

12. The device according to claim 11, characterized in that the instructions are executed to further perform the following operations:

generating scene data of the target game scene according to the target game scene, wherein, the scene data of the target game scene at least comprises: an identifier of a scene template of the target game scene, an identifier of a scene object in the target game scene and location information of the scene object in the target game scene; and storing the scene data.

13. The device according to claim 12, characterized in that the instructions are executed to further perform the following operations:

detecting whether current remaining storage space is larger than a preset threshold; and if yes, storing all data of the target game scene.

14. The device according to claim 12, characterized in that the instructions are executed to further perform the following operations:

performing an edition operation for the target game scene; and updating the scene data according to the edition operation.

15. The device according to claim 11, characterized in that the operation of obtaining a scene object of the target game scene from a present scene object database comprises:
　　determining identifiers of user-selectable scene objects according to user attribute information of a user; and
　　obtaining the scene object in the target game scene from the preset scene object database according to an identifier of a scene object selected by the user from the identifiers of the user-selectable scene objects.

16. A device for generating game data, characterized in that the device comprises:
　　a processor, and
　　a memory, having computer-executable instructions stored thereon, which when execute by the processor perform the following operations:
　　obtaining a target game scene; and
　　extracting, from the target game scene, an identifier of a scene template of the target game scene, an identifier of a scene object in the target game scene and location information of the scene object in the target game scene, and generating, according to the extracted information, scene data for reconstructing the target game scene, wherein illumination effect of the scene object in the target game scene can be determined according to the location information of the scene object in the target game scene and illumination parameters of a game engine itself, and display effect of the scene object in the target game scene can be determined according to a preset scene object display effect database and the identifier and location information of the scene object in the target game scene.

17. A device for uploading game data, characterized in that the device comprises:
　　a processor, and
　　a memory, having computer-executable instructions stored thereon, which when executed by the processor perform the following operations:
　　obtaining a target game scene, comprising:
　　　　obtaining a scene template of the target game scene from a preset scene template database according to an identifier of a user-selected scene template;
　　　　obtaining a scene object of the target game scene from a preset scene object database according to an identifier of a user-selected scene object;
　　　　determining the location of the scene object in the target game scene according to an edition instruction or a saving instruction for the scene object in the target game scene;
　　　　obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object;
　　　　determining illumination effect of the scene object in the target game scene according to the determined location of the scene object and illumination parameters of a game engine itself, and rendering the scene object in the target game scene in a manner of the determined illumination effect and thus obtaining the target game scene; and
　　　　obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, and wherein, the location information of the scene object in the target game scene is used in combination with the illumination parameters of the game engine itself to determine the illumination effect of the scene object in the target game scene, the identifier of the scene object in the target game scene is used in combination with the location information of the scene object in the target game scene and the preset scene object display effect database to determine display effect of the scene object in the target game scene; and
　　sending to a first destination end the data to be uploaded so as to complete uploading data for the target game scene.

18. The device according to claim 17, characterized in that the operation of obtaining data to be uploaded of the target game scene in the case that a present condition for uploading data is satisfied comprises:
　　verifying whether the target game scene satisfies a preset verification condition corresponding to a current game mode; and
　　if yes, obtaining the data to be uploaded of the target game scene.

19. The device according to claim 17, characterized in that the instructions are executed to further perform the following operations:
　　sending to a second destination end a data downloading instruction for a game scene to be downloaded; and
　　receiving an identifier of a scene template of the game scene to be downloaded, an identifier of a scene object in the game scene to be downloaded and location information of the scene object in the game scene to be downloaded that are fed back by the second destination end.

20. The device according to claim 19, characterized in that the instructions are executed to further perform the following operations:
　　obtaining the scene template of the game scene to be downloaded from a preset scene template database according to the identifier of the scene template of the game scene to be downloaded;
　　obtaining the scene object in the game scene to be downloaded from a preset scene object database according to the identifier of the scene object in the game scene to be downloaded;
　　determining illumination effect of the scene object in the game scene to be downloaded according to the location information of the scene object in the game scene to be downloaded and illumination parameters of the game engine itself;
　　determining display effect of the scene object in the game scene to be downloaded according to the scene object in the game scene to be downloaded, the location information of the scene object in the game scene to be downloaded and the preset scene object display effect database; and
　　displaying, in the scene template of the game scene to be downloaded, the scene object in the game scene to be downloaded in a manner of the determined display effect of the scene object and rendering the scene object in the game scene to be downloaded in a manner of the determined illumination effect of the scene object, according to the location of the scene object in the game scene to be downloaded.

* * * * *